(12) United States Patent
Brock et al.

(10) Patent No.: US 12,159,191 B2
(45) Date of Patent: Dec. 3, 2024

(54) SYSTEMS AND METHODS FOR MODIFYING FEEDBACK IN RESPONSE TO SUCCESSFUL INDICIA DECODING

(71) Applicant: ZEBRA TECHNOLOGIES CORPORATION, Lincolnshire, IL (US)

(72) Inventors: Christopher W. Brock, Manorville, NY (US); Charles Matthew Christophersen, Bayport, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/114,609

(22) Filed: Feb. 27, 2023

(65) Prior Publication Data

US 2024/0289577 A1    Aug. 29, 2024

(51) Int. Cl.
*G06K 7/14* (2006.01)
*G06K 7/10* (2006.01)

(52) U.S. Cl.
CPC ....... *G06K 7/1439* (2013.01); *G06K 7/10792* (2013.01); *G06K 7/1413* (2013.01)

(58) Field of Classification Search
CPC ..... G06K 7/10792; G06K 7/01; G06K 7/1439
USPC .................................................. 235/462.06
See application file for complete search history.

(56) References Cited

U.S. PATENT DOCUMENTS

| 2006/0208083 A1* | 9/2006 | Kotlarsky | ................ G06K 7/14 235/462.01 |
| 2011/0161076 A1* | 6/2011 | Davis | ................ H04M 1/72448 704/E15.001 |
| 2019/0205585 A1* | 7/2019 | Ji | ............................. G08B 7/06 |

FOREIGN PATENT DOCUMENTS

| KR | 20090128317 A | * | 12/2009 | ............. G06F 18/00 |
| WO | WO-2021034681 A1 | * | 2/2021 | ........... G03B 17/561 |

OTHER PUBLICATIONS

International Search Report and Written Opinion for International Application No. PCT/US2024/012150 mailed on Apr. 22, 2024.

* cited by examiner

*Primary Examiner* — Toan C Ly
(74) *Attorney, Agent, or Firm* — Yuri Astvatsaturov

(57) ABSTRACT

Devices and systems for modifying feedback in response to a successful indicia decode are disclosed herein. An example device includes an imaging sensor configured to capture image data, and an indicia decoder communicatively coupled with the imaging sensor that is configured to decode an indicia from the image data. The example device further includes one or more processors configured to: determine an ambient lighting condition based on at least a portion of at least one image frame captured as part of the image data; determine, based on the ambient lighting condition, whether to cause the imaging device to output a first feedback response or a second feedback response in response to a successful indicia decode; and responsive to receiving a successful indicia decode indication from the indicia decoder, cause the imaging device to output the first feedback response or the second feedback response.

15 Claims, 5 Drawing Sheets

SYSTEMS AND METHODS FOR MODIFYING FEEDBACK IN RESPONSE TO SUCCESSFUL INDICIA DECODING

BACKGROUND

Imaging devices, such as barcode readers, typically provide some form of feedback in response to successfully decoding an indicia. This feedback can include audible sound (e.g., a "beep" sound) emitted through an integrated speaker, and such sound is normally emitted at a volume level sufficient for the operator to easily hear the feedback. In fact, such feedback is typically emitted at a volume level sufficient for the operator and those around them to easily hear the feedback.

However, this audible feedback can cause issues in environments where loud and/or otherwise audible noise is discouraged or antithetical to the purpose of scanning/decoding an indicia. For example, many modern hospital environments include barcodes or other indicia associated with patient wristbands, medication, and other items. The wristbands, for example, can alleviate issues associated with disturbing patients through verbal requests for information. Unfortunately, medical professionals frequently need to scan these indicia at times when patients may be sleeping or should otherwise remain undisturbed. Thus, medical professionals attempting to scan a sleeping patient's wristband, medication, or other items proximate to such a patient conventionally risk disturbing the patient through the audible feedback resulting from a successful indicia scan/decode. This problem is further compounded given that such medical professionals often need to scan multiple items, and thus risk disturbing patients through such repeated audible feedback.

Accordingly, there is a need for systems and methods for modifying feedback in response to successful indicia decoding.

SUMMARY

In one embodiment, the present invention is an imaging device for decoding indicia. The imaging device includes: an imaging sensor configured to capture image data; an indicia decoder communicatively coupled with the imaging sensor that is configured to decode an indicia from the image data; and one or more processors configured to: determine an ambient lighting condition based on at least a portion of at least one image frame captured as part of the image data, determine, based on the ambient lighting condition, whether to cause the imaging device to output a first feedback response or a second feedback response in response to a successful indicia decode, and responsive to receiving a successful indicia decode indication from the indicia decoder, cause the imaging device to output the first feedback response or the second feedback response.

In a variation of this embodiment, the imaging device further comprises: a photodiode configured to: receive ambient light, and generate ambient light data based on the ambient light; and wherein the one or more processors are further configured to: determine the ambient lighting condition based on the portion of the at least one image frame and the ambient light data.

In another variation of this embodiment, the imaging sensor is further configured to capture the image data by: capturing a first frame that is illuminated at a first illumination level; and responsive to capturing the first frame, capturing a second frame that is illuminated at a second illumination level that is higher than the first illumination level. Further in this variation, the imaging sensor is further configured to capture the image data by: capturing a third frame in response to a triggering event, wherein the imaging sensor captures the third frame before the first frame.

In yet another variation of this embodiment, the one or more processors are further configured to: cause the imaging sensor to capture a first portion of the image data during an inactive state; receiving an indication of a triggering event; responsive to receiving the indication, causing the imaging sensor to transition from the inactive state to an active state, wherein the active state comprises a decoding session; and cause, during the decoding session, the imaging sensor to capture a second portion of the image data.

In still another variation of this embodiment, the one or more processors determine the ambient lighting condition by: determining one or more of (i) an average pixel value of the image data, or (ii) a peak pixel value of the image data; and determining whether the average pixel value satisfies a first threshold value or that the peak pixel value satisfies a second threshold value.

In yet another variation of this embodiment, the one or more processors are further configured to determine an ambient lighting condition by: identifying a first portion of the image data corresponding to an indicia; segmenting the image data into the first portion and a second portion that excludes the first portion; and determining the ambient lighting condition based on the second portion.

In still another variation of this embodiment, the imaging device further comprises a motion sensor configured to generate motion data associated with movement of the device, and wherein the one or more processors are further configured to: determine, based on the ambient lighting condition and the motion data, whether to cause the imaging device to output the first feedback response or the second feedback response in response to the successful indicia decode.

In yet another variation of this embodiment, the first feedback response of the imaging device is an audible tone emitted by the imaging device at a first volume level, the second feedback response of the imaging device is an audible tone emitted by the imaging device at a second volume level that is different from the first volume level, and the one or more processors are further configured to: reduce the second volume level of the audible tone in proportion to the ambient lighting condition.

In another embodiment, the present invention is an imaging device for decoding indicia. The device may comprise: an imaging sensor configured to capture image data; an indicia decoder communicatively coupled with the imaging sensor that is configured to decode an indicia from the image data; a photodiode configured to: receive ambient light, and generate ambient light data based on the ambient light; and one or more processors configured to: determine an ambient lighting condition based on the ambient light data, determine, based on the ambient lighting condition, whether to cause the imaging device to output a first feedback response or a second feedback response in response to a successful indicia decode, and responsive to receiving a successful indicia decode indication from the indicia decoder, cause the imaging device to output the first feedback response or the second feedback response.

In a variation of this embodiment, the imaging sensor is further configured to capture the image data by: capturing a first frame that is illuminated at a first illumination level; and responsive to capturing the first frame, capturing a second frame that is illuminated at a second illumination level that is higher than the first illumination level. Further in this variation, the imaging sensor is further configured to capture the image data by: capturing a third frame in response to a triggering event, wherein the imaging sensor captures the third frame before the first frame.

In another variation of this embodiment, the one or more processors are further configured to: cause the imaging sensor to capture a first portion of the image data during an inactive state; receiving an indication of a triggering event; responsive to receiving the indication, causing the imaging sensor to transition from the inactive state to an active state, wherein the active state comprises a decoding session; and cause, during the decoding session, the imaging sensor to capture a second portion of the image data.

In yet another variation of this embodiment, the one or more processors further determine the ambient lighting condition by: determining one or more of (i) an average pixel value of the image data, or (ii) a peak pixel value of the image data; and determining whether the average pixel value satisfies a first threshold value or that the peak pixel value satisfies a second threshold value.

In still another variation of this embodiment, the one or more processors are further configured to determine an ambient lighting condition by: identifying a first portion of the image data corresponding to an indicia; segmenting the image data into the first portion and a second portion that excludes the first portion; and determining the ambient lighting condition based on the ambient lighting data and the second portion.

In yet another variation of this embodiment, the imaging device further comprises a motion sensor configured to generate motion data associated with movement of the device, and wherein the one or more processors are further configured to: determine, based on the ambient lighting condition and the motion data, whether to cause the imaging device to output the first feedback response or the second feedback response in response to the successful indicia decode.

In still another variation of this embodiment, the first feedback response of the imaging device is an audible tone emitted by the imaging device at a first volume level, the second feedback response of the imaging device is an audible tone emitted by the imaging device at a second volume level that is different from the first volume level, and the one or more processors are further configured to: reduce the second volume level of the audible tone in proportion to the ambient lighting condition.

In yet another embodiment, the present invention is a tangible machine-readable medium comprising instructions for decoding indicia that, when executed, cause a machine to at least: receive an image comprising image data captured by an imaging device; determine an ambient lighting condition based on the image data; determine, based on the ambient lighting condition, whether to cause the imaging device to output a first feedback response or a second feedback response in response to a successful indicia decode; receive a successful indicia decode indication; and responsive to receiving the successful indicia decode indication, cause the imaging device to output the first feedback response or the second feedback response.

In a variation of this embodiment, the instructions, when executed, further cause the machine to determine the ambient lighting condition by: determining one or more of (i) an average pixel value of the image data, or (ii) a peak pixel value of the image data; and determining whether the average pixel value satisfies a first threshold value or that the peak pixel value satisfies a second threshold value.

In another variation of this embodiment, the instructions, when executed, further cause the machine to determine the ambient lighting condition by: identifying a first portion of the image data corresponding to an indicia; segmenting the image data into the first portion and a second portion that excludes the first portion; and determining the ambient lighting condition based on the ambient lighting data and the second portion.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
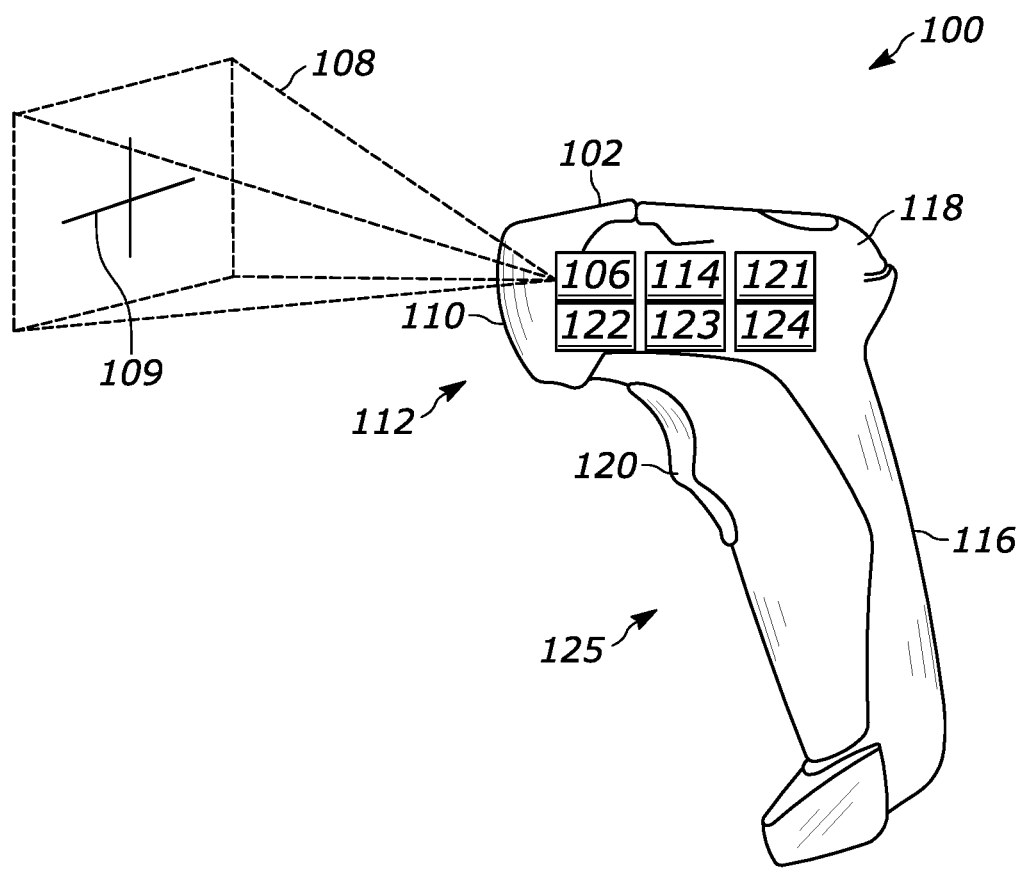
FIG. 1 is a perspective view of an example scanning device, in accordance with various embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventional imaging devices (e.g., barcode scanners) often scan indicia, and upon successful decoding of the indicia, emit and/or provide some form of feedback to the user/operator. This feedback may be provided in multiple forms, but a very common form is through audible sound (e.g., a "beep" sound) emitted at a volume level sufficient for the user and nearby people to easily hear it. As a result, users of these conventional imaging devices in low-noise environments (e.g., hospitals) frequently encounter issues where the audible feedback from a successful decode can cause disturbances (e.g., awakening/disturbing sleeping/resting patients).

The systems/methods of the present disclosure provide solutions to this audible feedback issue associated with traditional imaging devices. Namely, the methods/systems of the present disclosure alleviate this issue by introducing methods for modifying feedback in response to a successful indicia decode based on the ambient lighting conditions of the surrounding environment. This feedback modification may be performed prior to and/or in tandem with a successful indicia decode. In this manner, users may seamlessly transition from high-noise environments to low-noise environments without violating low-noise requirements and/or otherwise disturbing such low-noise environments with audible feedback.

As referenced herein, the illumination source(s) included as part of the exemplary imaging device(s) are light-emitting diodes (LEDs) configured to output light within visible wavelength ranges. However, it should be appreciated that the systems described herein may utilize illumination sources of any suitable type, color, design and/or combinations thereof.

Referring now to the figures, FIG. 1 is a perspective view of an example imaging device 100, in accordance with various embodiments of the present invention. The example imaging device 100 includes an example housing 102 that includes a generally elongated handle or lower handgrip portion 116, and an upper body portion 118 having the front side 112 at which the front-facing opening or window 110 is located. The cross-sectional dimensions and overall size of the handgrip portion 116 are such that the example imaging device 100 can be conveniently held in an operator's hand during operation. The front-facing opening or window 110 is configured to face generally away from a user when the user has the example imaging device 100 in a handheld position. The portions 116 and 118 may be constructed of a lightweight, resilient, shock-resistant, self-supporting material, such as a synthetic plastic material. The housing 102 may be injection molded, but can also be vacuum-formed or blow-molded to form a thin hollow shell which bounds an interior space whose volume is sufficient to contain the various components of the handheld scanner 100. Although the housing 102 is illustrated as a portable, point-of-transaction, gun-shaped, handheld housing, any other configuration including a hands-free configuration could be used.

The example imaging device 100 also includes an imaging sensor 106 that is disposed within the example housing 102. The imaging sensor 106 captures image data representing a target in a field of view 108 at least partially defined by a front-facing opening or window 110 (also referenced herein as an "optical window") on a front side 112 of the example imaging device 100. In particular, the example imaging device 100 may also include a manually actuatable trigger 120 that is mounted in a moving relationship on the handgrip portion 116 in a forward facing region 125 of the handgrip portion 116 that is configured to actuate an imaging shutter (not shown). An operator's finger can be used to actuate (e.g., depress) the trigger 120 once a target falls within the imaging field of view (FOV) 108, thereby causing the imaging shutter to actuate (e.g., open) and expose the imaging sensor 106 to capture an image of the target.

As a result of actuating the trigger 120, the example imaging device 100 may generate an aiming pattern 109, which may visually indicate the field of view 108 of the example imaging device 100 for the operator utilizing the device 100, and may more specifically indicate a region within the field of view 108 where the device 100 may successfully scan and/or otherwise interpret an indicia within the field of view 108. Generally speaking, the aiming pattern 109 may be generated by an aiming assembly (not shown), which may be separate and/or otherwise independent from the illumination light emitting diode (LED) 123. In particular, the aiming pattern 109 may represent illumination emitted by the aiming assembly for the purposes of assisting a user/operator with positioning the optical window 110 in a suitable position/orientation to subsequently capture image data. This aiming pattern 109 may disappear (i.e., the aiming assembly may stop emitting illumination) prior to capturing image data, and the illumination LED 123 may then illuminate the FOV 108 during image data capture for any suitable indicia decoding purposes.

Thus, the imaging sensor 106 may be configured to capture image data in conjunction with illumination provided by an illumination light emitting diode (LED) 123. More specifically, in response to a trigger 120 pull from the user, the imaging sensor 106 may capture image data in a sequence of image frames where illumination may or may not be provided by the illumination LED 123. The ambient lighting module 122 may include instructions configured to control the illumination provided by the illumination LED 123. For example, when the user pulls the trigger 120 to capture image data of an indicia, the imaging sensor 106 may capture image data during an initial image frame where the ambient lighting module 122 causes the illumination LED 123 to not emit any illumination. In this manner, the resulting image data may be illuminated primarily by ambient light.

Of course, in certain embodiments, the ambient lighting module 122 may cause the illumination LED 123 to not emit illumination during any suitable image frame, such as a second image frame, third frame, etc., and/or any other suitable image frame or combinations thereof that may occur in response to a trigger 120 pull by a user. Further, in certain embodiments, the ambient lighting module 122 may cause the illumination LED 123 to emit a reduced level of illumination during the first image frame, second image frame, and/or any other image frame in which the ambient lighting module 123 may analyze the captured image data to determine an ambient lighting condition. Accordingly, the determination of an ambient lighting condition may be based on image data corresponding to any suitable image frame illuminated by any suitable level of illumination provided by ambient light and/or the illumination LED 123.

Additionally, or alternatively, the ambient lighting module 123 may cause the example imaging device 100 to capture image data during an inactive state, and to capture additional image data in response to a triggering event. In certain embodiments, the example imaging device 100 may function in a presentation mode, where the example imaging device 100 may passively monitor for the presence of an object in an inactive state that includes the indicia decoder 114 not processing captured image data. In such a presentation mode, the example imaging device 100 may transition into an active state when an object is detected within the FOV. In particular, in the inactive state, the example imaging device 100 may passively capture image data until an object is detected within the FOV, at which point, the device 100 may transition to the active state by ramping up the emitted illumination at a predetermined rate and focusing on the object. The active state may also represent the beginning of a decoding session, during which, the example imaging device 100 may actively transmit captured image data to the indicia decoder 114 to identify and decode indicia represented in the captured image data.

As part of this process, the ambient lighting module 122 may cause the example imaging device 100 to alternate between high illumination emitted from the illumination LED 123 and low/no illumination emitted from the illumination LED 123 during the inactive state and/or the active state. When the example imaging device 100 transitions to the active state, the ambient lighting module 122 may cause the device 100 to capture image data during the active state, and to analyze captured image data from the inactive state and/or the active state to determine the ambient lighting condition.

Regardless, one or more processors (not shown) of the example imaging device 100 may execute instructions included as part of the ambient lighting module 122 to receive the image data captured during an initial image frame, and to determine an ambient lighting condition based on the image characteristics of the image data. The one or more processors may determine that the ambient lighting of the surrounding environment is dim enough (e.g., below a threshold value) that the feedback provided by the example imaging device 100 should be modified in the event that an indicia is successfully decoded. However, the processors may instead determine that the ambient lighting of the surrounding environment is bright enough (e.g., above the threshold value) that the feedback provided by the example imaging device 100 should not be modified in the event that an indicia is successfully decoded.

More generally, the ambient lighting condition may indicate whether the feedback provided by the example imaging device 100 should be modified based on the ambient light represented in the image data. In particular, the ambient lighting condition may be or include a value representing a level of ambient lighting in the surrounding environment of the example imaging device 100. Such a value may represent the relative level of ambient lighting present in the surrounding environment on a scale (e.g., from 0 to 100), a percentage value (0% to 100%), an intensity value (e.g., X lux, Y lumens), an average pixel value (e.g., 0 to 255), a peak pixel value (e.g., 0 to 255), and/or any other suitable values or combinations thereof.

Moreover, in certain embodiments, the ambient lighting module 122 may cause the processors to segment the captured image data in a manner that increases the accuracy of the ambient lighting condition determination. For example, the ambient lighting module 122 may cause the processors to identify a first portion of the image data that includes an indicia and a second portion of the image data that does not include the indicia. Indicia typically have areas of high contrast that may skew and/or otherwise erroneously influence the determination of an ambient lighting condition. Thus, eliminating the indicia from the determination may result in a more accurate determination of the true ambient lighting condition of the surrounding environment.

Additionally, or alternatively, the example imaging device 100 may include a motion sensor (not shown) configured to monitor motion of the example imaging device 100. The motion sensor may measure and/or generate motion data associated with movement of the example imaging device 100, and this motion data may be used in conjunction with an ambient lighting condition to determine whether or not to modify feedback provided by the example imaging device 100. For example, a medical professional may remove the example imaging device 100 from a charging location and may begin walking towards a patient, such that the motion sensor generates motion data representing the medical professional walking with the device 100. The example imaging device 100 may utilize the motion data to determine, for example, an approximate location of the imaging device 100 within the surrounding environment (e.g., in a particular patient's room). As another example, the example imaging device 100 may utilize the motion data to determine that the medical professional is moving the example imaging device 100 relatively slowly, which may be indicative of an environment in which loud noises are discouraged (e.g., a room with sleeping patients). In any event, the feedback module 124 may analyze the motion data in tandem with the ambient lighting condition to determine that the example imaging device 100 is currently capturing image data of an indicia in a first patient's room with a low ambient lighting condition, and that the feedback of the example imaging device 100 should be modified.

The threshold value(s) may have identical dimensions to the value of the ambient lighting condition, and may correspond to a value, below which, the feedback provided by the example imaging device 100 should be modified. However, if the value of the ambient lighting condition exceeds the threshold value, the processors may not modify the feedback provided by the example imaging device 100. Namely, if the value of the ambient lighting condition exceeds the threshold value, then the feedback module 124 may include instructions that cause the example imaging device 100 to provide an audible sound in response to a successful indicia decode; and if the value of the ambient lighting condition does not exceed the threshold value, the feedback module 124 may include instructions that cause the example imaging device 100 to not provide the audible sound in response to the successful indicia decode. In some embodiments, when the ambient lighting condition does not exceed the threshold value, the feedback module 124 may cause the feedback provided by the example imaging device 100 to be reduced in proportion to the degree to which the ambient lighting condition fails to satisfy the threshold value.

Of course, it should be appreciated that the feedback modified in response to a successful indicia decode may be or include visible feedback, haptic feedback, audible feedback, and/or any other suitable feedback of any suitable magnitude/output level that may be provided by the example imaging device 100. Accordingly, the feedback module 124 may include and/or otherwise be communicatively coupled with various feedback devices (not shown), such as a speaker, a haptic (e.g. vibrating) device, a lighting device, and/or any other suitable feedback devices or combinations thereof. Further, in certain embodiments, the feedback module 124 may include instructions that cause the example imaging device 100 to modify the feedback provided by the example imaging device 100 from, for example, audible feedback to haptic feedback. As an example, the ambient lighting module 122 may determine that the ambient lighting conditions of the surrounding environment are relatively low, and do not exceed the threshold value. The example imaging device 100 may then successfully decode an indicia, and the feedback module 124 may thereafter cause the example imaging device 100 to substitute haptic feedback (e.g., gently vibrating the example imaging device 100) in place of the typical audible feedback.

The example imaging device 100 also includes an indicia decoder 114 in communication with the imaging sensor 106. The indicia decoder 114 may generally be configured to receive image data comprising an image of a target object that includes an indicia associated with the target object. Of course, in certain instances, the image data may not include the target object, but may only include the indicia associated with the target object. In any event, the indicia decoder 114 may receive the image data, identify an indicia represented in the image data, and decode the indicia represented in the image data.

The example imaging device 100 also includes a photodiode 121 that may generally be configured to capture ambient light of an environment. For example, as a user begins to aim the example imaging device 100 to capture image data of an indicia and/or as the user pulls the trigger 120 to capture image data, the photodiode 121 may receive ambient light of the surrounding environment. The ambient lighting module 122 may be further configured to cause the photodiode 121 to capture ambient light in conjunction with image frame captures of the imaging sensor 106. Namely, the imaging sensor 106 may capture image data during an image frame following the trigger 120 pull by the user, and the ambient lighting module 122 may cause the photodiode 121 to simultaneously capture ambient light data during the same image frame as the imaging sensor 106. The photodiode 121 may thereby generate ambient light data based on the ambient light, and may transmit the ambient light data to the one or more processors of the example imaging device 100. The processors may then analyze this ambient light data in accordance with instructions included as part of the ambient lighting module 122 to determine the ambient light condition, which may influence the feedback provided to a user in the event of a successful indicia decode from the image data captured during the initial image frame.

Moreover, in certain embodiments, the processors of the example imaging device 100 may execute instructions included as part of the ambient lighting module 122 to analyze the image data captured by the imaging sensor 106 in tandem with the ambient light data generated by the photodiode 121 to determine the ambient lighting condition. For example, the image data may include pixel values ranging from 0 to 255 that the processors are configured to interpret and determine a first value representing the ambient lighting condition, and the ambient light data may similarly include pixel values that the processors are configured to interpret and determine a second value representing the ambient lighting condition. The processors may analyze these two sets of data by calculating an aggregate value of the ambient lighting condition in accordance with any suitable statistical formulation. For example, the ambient lighting module 122 may cause the processors to determine the aggregate value of the ambient lighting condition by calculating an average pixel value of the image data and/or ambient light data, determining a peak pixel value of the image data and/or the ambient light data, and/or by performing any other suitable calculation(s) or combinations thereof. Thereafter, the ambient lighting module 122 may cause the processors to determine whether such an aggregate value of the ambient lighting condition satisfies the corresponding threshold value.

The example imaging device 100 also includes the illumination light emitting diode (LED) 123 configured to emit illumination in accordance with instructions included as part of the ambient lighting module 122. Generally speaking, the illumination LED 123 may be configured to output illumination in response to a user pulling the trigger 120. In particular, the ambient lighting module 122 may be configured to cause the illumination LED 123 to emit illumination during specified image frames that are not intended for ambient lighting condition analysis, as described herein. Moreover, in certain embodiments, the feedback module 124 may be configured to cause the illumination LED 123 emit varying levels of illumination during image capture frames in response to a user pulling the trigger 120.

For example, the ambient lighting module 122 may determine an ambient lighting condition indicating that the ambient light of the surrounding environment is very dim. In this circumstance, even the illumination generated by the illumination LED 123 to capture image data may be sufficient to disturb nearby persons (e.g., sleeping patients in a hospital). Accordingly, the feedback module 124 may be configured to instruct the illumination LED 123 to provide reduced illumination levels for image capture until the ambient light condition of the surrounding environment exceeds a threshold value.

Figure 2:
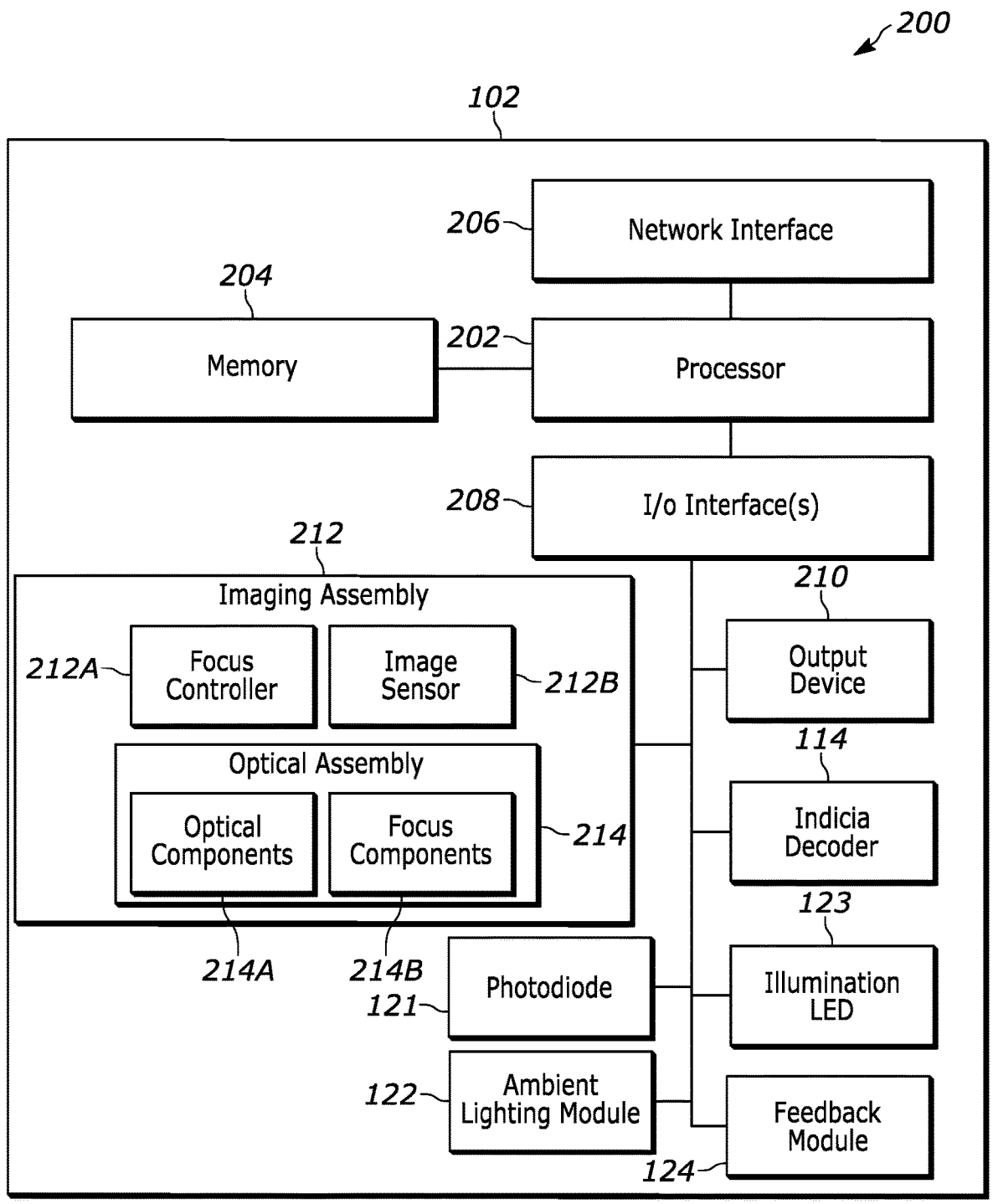
FIG. 2 is a block diagram representative of an example logic circuit for implementing the example scanning device of FIG. 1, in accordance with various embodiments described herein.

FIG. 2 is a block diagram representative of an example logic circuit capable of implementing, for example, the example imaging device 100 of FIG. 1. The example logic circuit of FIG. 2 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 2 includes a processor 202 such as, for example, one or more microprocessors, controllers, and/or any suitable type of processor. The example processing platform 200 of FIG. 2 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowchart(s) of this disclosure. Additionally, or alternatively, machine-readable instructions corresponding to the example operations described herein may be stored on one or more removable media (e.g., a compact disc (CD), a digital versatile disc (DVD), removable flash memory, etc.) that may be coupled to the processing platform 200 to provide access to the machine-readable instructions stored thereon. The processor 202 and the memory 204 are disposed in the housing 102.

The example processing platform 200 of FIG. 2 includes one or more communication interfaces such as, for example, one or more network interfaces 206, and/or one or more input/output (I/O) interfaces 208 disposed in the housing 102. The communication interface(s) may enable the processing platform 200 of FIG. 2 to communicate with, for example, another device, system, host system (e.g., an inventory management system, a POS station, etc.), datastore, database, and/or any other machine.

The example processing platform 200 of FIG. 2 may include the network interface(s) 206 to enable communication with other machines (e.g., an inventory management system, a POS station, etc.) via, for example, one or more networks. The example network interface(s) 206 include any suitable type of communication interface(s) (e.g., wired and/or wireless interfaces) configured to operate in accordance with any suitable communication protocol(s). Example network interfaces 206 include a TCP/IP interface, a Wi-Fi™ transceiver (e.g., according to the IEEE 802.11x family of standards), an Ethernet transceiver, a cellular network radio, a satellite network radio, or any other suitable interface based on any other suitable communication protocols or standards.

The example, processing platform 200 of FIG. 2 may include the input/output (I/O) interface(s) 208 (e.g., a Bluetooth® interface, a near-field communication (NFC) interface, a universal serial bus (USB) interface, a serial interface, an infrared interface, etc.) to (1) enable receipt of user input (e.g., from the trigger 120 of FIG. 1, a touch screen, keyboard, mouse, touch pad, joystick, trackball, microphone, button, etc.), (2) communicate output data (e.g., mode change confirmations, visual indicators, instructions, data, images, etc.) to the user (e.g., via an output device 210, speaker, printer, haptic device, etc.), and/or (3) interact with other components of the handheld scanner 200 (e.g., the imaging assembly 212, the output device 210, the indicia decoder 114, the photodiode 121, the ambient lighting module 122, the illumination LED 123, the feedback module 124, etc.). Example output devices 210 may include a sound generation device, a haptic device, a light emitting device, or the like.

To capture images of objects and/or barcodes on objects, the example processing platform 200 includes the imaging assembly 212 disposed in the housing. The imaging assembly 212 includes an image sensor 212B under control of, for example, the processor 202 to capture image frames representative of the portion of an environment in which the example imaging device 100 is operating that falls within the imaging field of view 108 of the imaging assembly 212. The image sensor 212B includes a plurality of photosensitive elements forming a substantially flat surface, and may be the imaging sensor 106 of FIG. 1. The processor 202 may be communicatively coupled to the imaging assembly 212 via the input/output (I/O) interface(s) 208.

The imaging assembly 212 includes an optical assembly 214 to form images of objects in the field of view 108 on the surface of the image sensor 212B. The optical assembly 214 may include any number and/or type(s) of optical elements and/or components 214A including, for example, one or more lenses, filters, focus motors, apertures, lens holder, liquid lenses, or any other components and/or optical elements. Moreover, to focus the imaging assembly 212 on an object, the imaging assembly 212 may include a focus controller 212A, and the optical assembly 214 may include any number and/or type(s) of focus components 214B (e.g., motors, liquid lenses, etc.). In some examples, the focus controller 212A is implemented by the processor 202. In some examples, the imaging assembly 212 is a fixed-focus scanner.

The example processing platform 200 also includes any number and/or type(s) indicia decoders 114 (e.g., the indicia decoder 114) to detect and/or decode indicia to determine the payload of the indicia. In some examples, the indicia decoder 114 is implemented by the processor 202. The indicia decoder 114, e.g., via the processor 202, conveys the payload of decoded indicia to a host system via a communication interface such as the network interface(s) 206 and/or the I/O interface(s) 208.

To illuminate a target to be imaged, the example processing platform 200 may also include the illumination LED 123. The illumination LED 123 may emit illumination in the field of view 108 to, for example, facilitate autofocusing and/or improve the quality of image frames captured by the image sensor 106. The example processing platform 200 may also include an ambient lighting module 122 that is configured to control the illumination timing of the illumination LED 123, and to determine ambient lighting conditions based on captured image data from the imaging assembly 212 and/or the photodiode 121. Additionally, the example processing platform 200 may include the feedback module 124 that is configured to receive indications of the ambient lighting condition from the ambient lighting module 122, and to generate control instructions that modify feedback of the example imaging device 100 (e.g., via the output device 210) based on the ambient lighting condition.

Figure 3A:
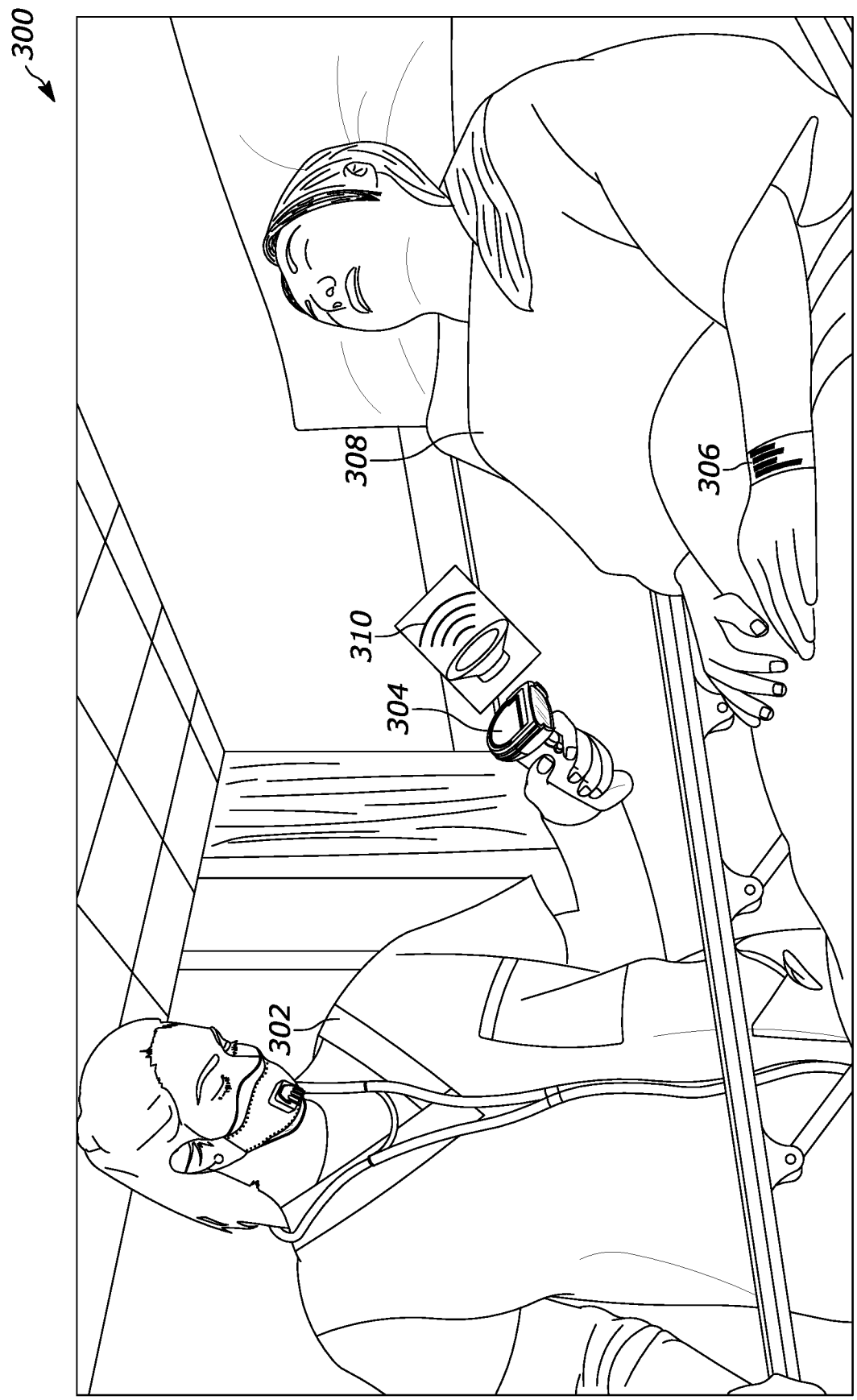
FIG. 3A illustrates an example feedback response of a scanning device in response to successfully decoding an indicia in an environment with relatively high levels of ambient light, in accordance with various embodiments of the present invention.

FIG. 3A illustrates an example scenario 300 involving a feedback response of a scanning device 304 in response to successfully decoding an indicia in an environment with relatively high levels of ambient light. As illustrated in FIG. 3A, the environment in the example scenario 300 may be a hospital in which a medical professional 302 is utilizing a scanning device 304 to scan a wristband 306 of a patient 308. It should be understood that this example scenario 300 is for the purposes of discussion only, and that the actions performed by the scanning device 304 in this scenario 300 may be applicable and performed in any suitable environment.

In any event, the medical professional 302 may enter the patient's 308 room to scan the patient's 308 wristband 306 and acquire information related to the patient 308. For example, the medical professional 302 may enter the patient's 308 room at a time where the overhead lights are illuminated, and the patient 308 is simply lying in bed. The medical professional 302 may approach the patient 308, and may pull the trigger of the scanning device 304. The scanning device 304 may then proceed to acquire image data in accordance with instructions included as part of an ambient lighting module (e.g., ambient lighting module 122).

More specifically, the scanning device 304 may capture at least one image frame of image data without illumination emitted by an illumination LED (e.g., illumination LED 123). The scanning device 304 may analyze the image data captured during this image frame without external illumination (e.g., emitted by an illumination LED), and may determine that the ambient lighting condition of the surrounding environment is relatively high. As a result, the scanning device 304 may execute instructions included as part of a feedback module (e.g., feedback module 124) to determine that, based on the relatively high ambient lighting condition, the feedback provided by the scanning device 304 in response to a successful decode should not be modified.

The scanning device 304 may then analyze captured image data from other image frames to identify/decode the indicia from the patient's 308 wristband 306. For example, the scanning device 304 may capture image data with illumination provided by the illumination LED during a first image frame after the medical professional 302 pulls the trigger of the scanning device 304. In this example, the scanning device 304 may identify an indicia on the patient's 308 wristband 306 and may decode the indicia, but may wait to provide feedback until the scanning device 304 determines whether or not to modify the associated feedback.

Thus, the scanning device 304 may delay providing feedback until the feedback module determines that the feedback should not be modified, at which point, the scanning device 304 may provide feedback to indicate the successful decode of the indicia on the patient's 308 wristband 306. This feedback may be audible sound 310 (e.g., a "beep" sound) emitted through an integrated speaker of the scanning device 304. However, it should be appreciated that the feedback may be of any suitable type or magnitude, such as gentle/strong vibrations (e.g., haptic feedback), soft/bright lights (e.g., visual feedback), quiet/loud audible feedback (e.g., sound feedback), and/or any other suitable type or magnitude of feedback or any combinations thereof.

Of course, as previously mentioned, the illuminated and non-illuminated image frames used for identifying/decoding indicia and determining feedback modification, respectively, may occur in any suitable sequence. For example, the non-illuminated image frame(s) for determining feedback modification may occur during a first image frame, a second image frame, and/or any other suitable image frame(s) or combinations thereof. Similarly, the illuminated image frame(s) for identifying/decoding indicia may occur during a first image frame, a second image frame, and/or any other suitable image frame(s) or combinations thereof.

Figure 3B:
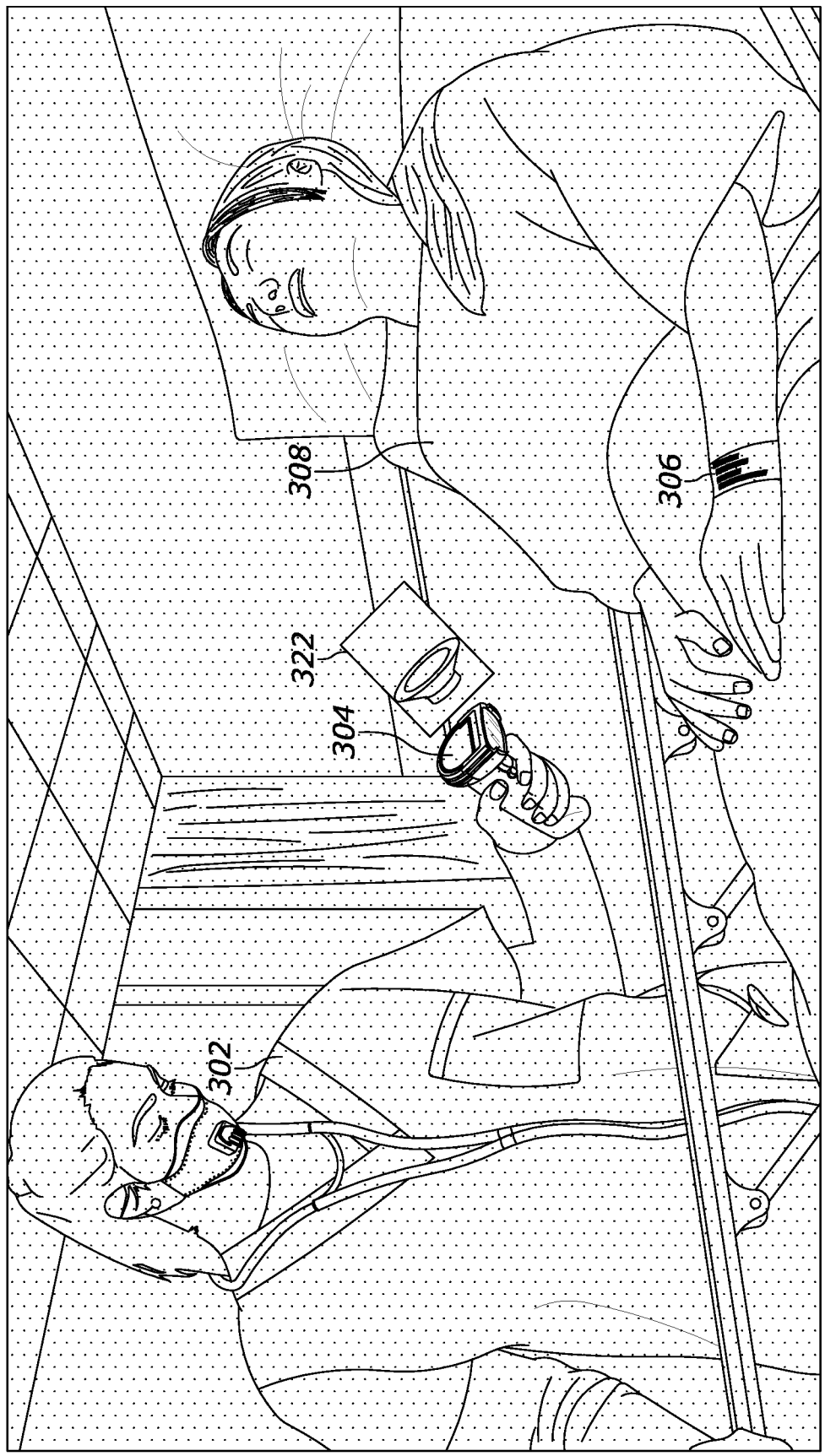
FIG. 3B illustrates another example feedback response of a scanning device in response to successfully decoding an indicia in an environment with relatively low levels of ambient light, in accordance with various embodiments of the present invention.

FIG. 3B illustrates another example scenario 320 involving a feedback response of a scanning device 304 in response to successfully decoding an indicia in an environment with relatively low levels of ambient light (e.g., represented by the patterning in FIG. 3B). As illustrated in FIG. 3B, the environment in the example scenario 300 may be a hospital in which a medical professional 302 is utilizing a scanning device 304 to scan a wristband 306 of a patient 308. It should be understood that this example scenario 320 is for the purposes of discussion only, and that the actions performed by the scanning device 304 in this scenario 320 may be applicable and performed in any suitable environment.

In any event, the medical professional 302 may enter the patient's 308 room to scan the patient's 308 wristband 306 and acquire information related to the patient 308. For example, the medical professional 302 may enter the patient's 308 room at a time where the overhead lights are not illuminated or dimmed, and the patient 308 is asleep in bed. The medical professional 302 may approach the patient 308, and may pull the trigger of the scanning device 304. The scanning device 304 may then proceed to acquire image data in accordance with instructions included as part of an ambient lighting module (e.g., ambient lighting module 122).

More specifically, the scanning device 304 may capture at least one image frame of image data without illumination emitted by an illumination LED (e.g., illumination LED 123). The scanning device 304 may analyze the image data captured during this image frame without external illumination (e.g., emitted by an illumination LED), and may determine that the ambient lighting condition of the surrounding environment is relatively low. As a result, the scanning device 304 may execute instructions included as part of a feedback module (e.g., feedback module 124) to determine that, based on the relatively low ambient lighting condition, the feedback provided by the scanning device 304 in response to a successful decode should be modified.

The scanning device 304 may then analyze captured image data from other image frames to identify/decode the indicia from the patient's 308 wristband 306. For example, the scanning device 304 may capture image data with illumination provided by the illumination LED during a first image frame after the medical professional 302 pulls the trigger of the scanning device 304. In this example, the scanning device 304 may identify an indicia on the patient's 308 wristband 306 and may decode the indicia, but may wait to provide feedback until the scanning device 304 determines whether or not to modify the associated feedback.

Thus, the scanning device 304 may delay providing feedback until the feedback module determines that the feedback should be modified, at which point, the scanning device 304 may provide no feedback and/or a modified form of feedback to indicate the successful decode of the indicia on the patient's 308 wristband 306. The modified feedback may not include any audible sound 322 emitted through the integrated speaker of the scanning device 304, but instead may include a gentle vibration (not shown), a low intensity light (not shown), and/or any other suitable feedback that is unlikely to awaken and/or otherwise disturb the sleeping patient 308. However, it should be appreciated that the feedback may be of any suitable type or magnitude, such as gentle/strong vibrations (e.g., haptic feedback), soft/bright lights (e.g., visual feedback), quiet/loud audible feedback (e.g., sound feedback), and/or any other suitable type or magnitude of feedback or any combinations thereof.

Of course, as previously mentioned, the illuminated and non-illuminated image frames used for identifying/decoding indicia and determining feedback modification, respectively, may occur in any suitable sequence. For example, the non-illuminated image frame(s) for determining feedback modification may occur during a first image frame, a second image frame, and/or any other suitable image frame(s) or combinations thereof. Similarly, the illuminated image frame(s) for identifying/decoding indicia may occur during a first image frame, a second image frame, and/or any other suitable image frame(s) or combinations thereof.

Figure 4:
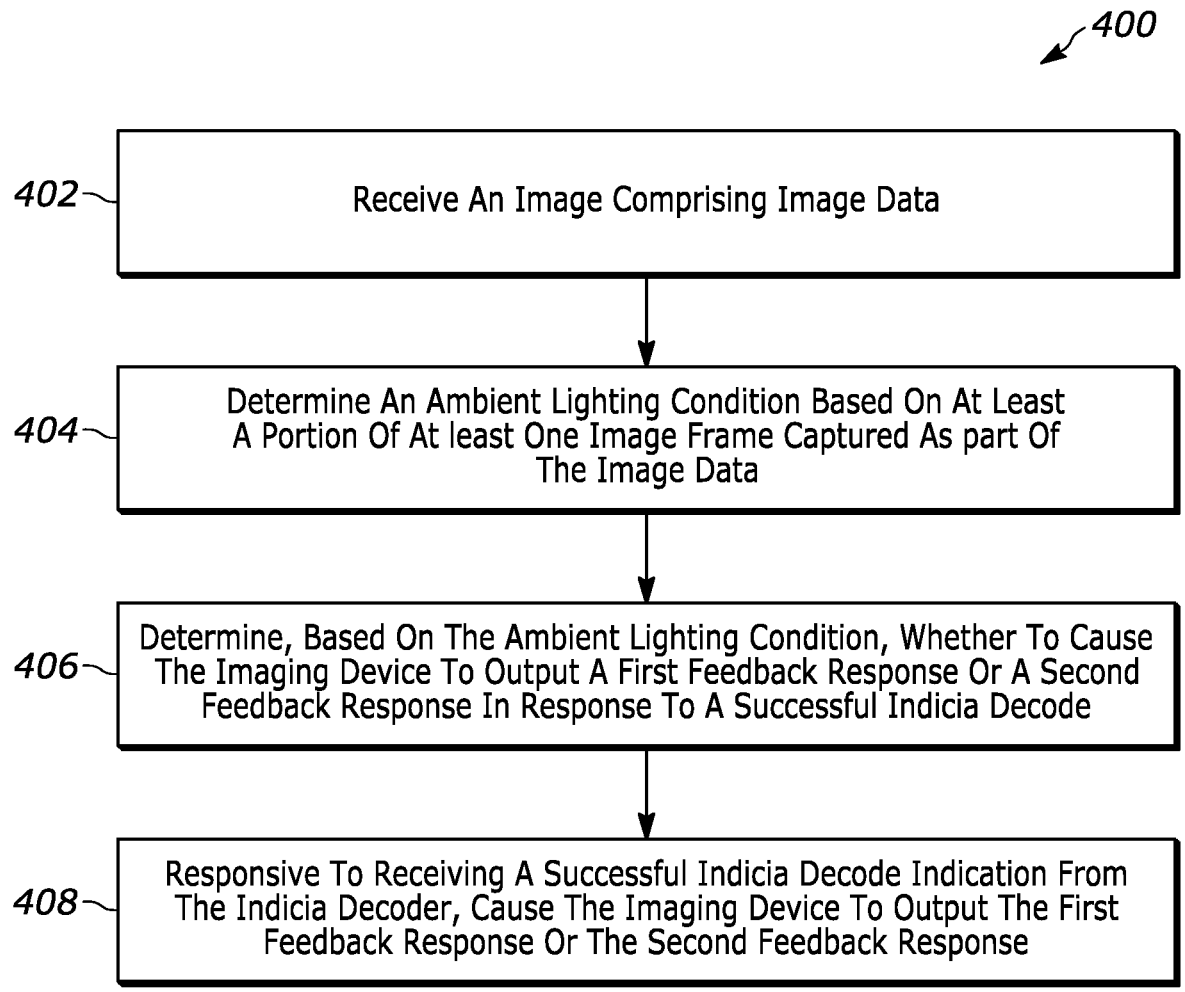
FIG. 4 illustrates an example method for modifying feedback in response to a successful indicia decode, in accordance with various embodiments of the present invention.

FIG. 4 illustrates an example method 400 for modifying feedback in response to a successful indicia decode, in accordance with various embodiments of the present invention. It should be understood that, in certain embodiments, any of the blocks of the method 400 may be performed by any of the example imaging device 100, the imaging assembly 212, the photodiode 121, the ambient lighting module 122, the illumination LED 123, the feedback module 124, the processor(s) 202, and/or any other suitable device.

The method 400 includes receiving an image comprising image data (block 402). As previously mentioned, the image data may be or include one or more image frames that are captured with various levels of illumination. For example, a first image frame captured as part of the image data may not receive illumination from the imaging device (e.g., via the illumination LED 123). Instead, the first frame captured as part of the image data may be illuminated only by ambient light. Subsequently, a second frame, third frame, etc. captured as part of the image data may be illuminated by the illumination LED and/or any other suitable source. However, it should be understood that any suitable image frame captured as part of the image data may receive any suitable level of illumination from the imaging device (e.g., via the illumination LED 123). Moreover, the image data may or may not include an indicia. In particular, any image frame of the image data captured by the imaging device may include no indicia, a portion of an indicia, an indicia that is too dim to successfully decode, and/or may include an indicia that an indicia decoder (e.g., indicia decoder 114) may successfully decode.

In any event, the method 400 may further include determining an ambient lighting condition based on at least a portion of at least one image frame captured as part of the image data (block 404). The method 400 may further include determining, based on the ambient lighting condition, whether to cause the imaging device to output a first feedback response or a second feedback response in response to a successful indicia decode (block 406). The method 400 may also include, responsive to receiving a successful indicia decode indication from the indicia decoder, causing the imaging device to output the first feedback response or the second feedback response (block 408).

In certain embodiments, the imaging device further comprises: a photodiode configured to: receive ambient light, and generate ambient light data based on the ambient light; and wherein the one or more processors are further configured to: determine the ambient lighting condition based on the portion of the at least one image frame and the ambient light data.

In some embodiments, the imaging sensor is further configured to capture the image data by: capturing a first frame that is illuminated at a first illumination level; and responsive to capturing the first frame, capturing a second frame that is illuminated at a second illumination level that is higher than the first illumination level. Further in this variation, the imaging sensor is further configured to capture the image data by: capturing a third frame in response to a triggering event, wherein the imaging sensor captures the third frame before the first frame.

In certain embodiments, the one or more processors are further configured to: cause the imaging sensor to capture a first portion of the image data during an inactive state; receiving an indication of a triggering event; responsive to receiving the indication, causing the imaging sensor to transition from the inactive state to an active state, wherein the active state comprises a decoding session; and cause, during the decoding session, the imaging sensor to capture a second portion of the image data.

In some embodiments, the one or more processors determine the ambient lighting condition by: determining one or more of (i) an average pixel value of the image data, or (ii) a peak pixel value of the image data; and determining whether the average pixel value satisfies a first threshold value or that the peak pixel value satisfies a second threshold value.

In certain embodiments, the one or more processors are further configured to determine an ambient lighting condition by: identifying a first portion of the image data corresponding to an indicia; segmenting the image data into the first portion and a second portion that excludes the first portion; and determining the ambient lighting condition based on the second portion.

In some embodiments, the imaging device further comprises a motion sensor configured to generate motion data associated with movement of the device, and wherein the one or more processors are further configured to: determine, based on the ambient lighting condition and the motion data, whether to cause the imaging device to output the first feedback response or the second feedback response in response to the successful indicia decode.

In certain embodiments, the first feedback response of the imaging device is an audible tone emitted by the imaging device at a first volume level, the second feedback response of the imaging device is an audible tone emitted by the imaging device at a second volume level that is different from the first volume level, and the one or more processors are further configured to: reduce the second volume level of the audible tone in proportion to the ambient lighting condition.

Of course, it is to be appreciated that the actions of the method 400 may be performed any suitable number of times, and that the actions described in reference to the method 400 may be performed in any suitable order.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAS, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device for decoding indicia, the device comprising:
   an imaging sensor configured to capture image data;
   an indicia decoder communicatively coupled with the imaging sensor that is configured to decode an indicia from the image data; and
   one or more processors configured to:
      determine an ambient lighting condition based on at least a portion of at least one image frame captured as part of the image data,
      determine, based on the ambient lighting condition, whether to cause the imaging device to output a first feedback response or a second feedback response in response to a successful indicia decode, and
      responsive to receiving a successful indicia decode indication from the indicia decoder, cause the imaging device to output the first feedback response or the second feedback response,
   wherein the one or more processors are further configured to:
      cause the imaging sensor to capture a first portion of the image data during an inactive state;
      receiving an indication of a triggering event;
      responsive to receiving the indication, causing the imaging sensor to transition from the inactive state to an active state, wherein the active state comprises a decoding session; and
      cause, during the decoding session, the imaging sensor to capture a second portion of the image data.

2. The imaging device of claim 1, further comprising:
   a photodiode configured to:
      receive ambient light, and
      generate ambient light data based on the ambient light; and
   wherein the one or more processors are further configured to:
      determine the ambient lighting condition based on the portion of the at least one image frame and the ambient light data.

3. The imaging device of claim 1, wherein the imaging sensor is further configured to capture the image data by:
   capturing a first frame that is illuminated at a first illumination level; and
   responsive to capturing the first frame, capturing a second frame that is illuminated at a second illumination level that is higher than the first illumination level.

4. The imaging device of claim 3, wherein the imaging sensor is further configured to capture the image data by:
   capturing a third frame in response to a triggering event, wherein the imaging sensor captures the third frame before the first frame.

5. The imaging device of claim 1, wherein the one or more processors determine the ambient lighting condition by:
   determining one or more of (i) an average pixel value of the image data, or (ii) a peak pixel value of the image data; and
   determining whether the average pixel value satisfies a first threshold value or that the peak pixel value satisfies a second threshold value.

6. The imaging device of claim 1, wherein the one or more processors are further configured to determine an ambient lighting condition by:
- identifying a first portion of the image data corresponding to an indicia;
- segmenting the image data into the first portion and a second portion that excludes the first portion; and
- determining the ambient lighting condition based on the second portion.

7. The imaging device of claim 1, further comprising a motion sensor configured to generate motion data associated with movement of the device, and wherein the one or more processors are further configured to:
- determine, based on the ambient lighting condition and the motion data, whether to cause the imaging device to output the first feedback response or the second feedback response in response to the successful indicia decode.

8. The imaging device of claim 1, wherein the first feedback response of the imaging device is an audible tone emitted by the imaging device at a first volume level, the second feedback response of the imaging device is an audible tone emitted by the imaging device at a second volume level that is different from the first volume level, and the one or more processors are further configured to:
- reduce the second volume level of the audible tone in proportion to the ambient lighting condition.

9. An imaging device for decoding indicia, the device comprising:
- an imaging sensor configured to capture image data;
- an indicia decoder communicatively coupled with the imaging sensor that is configured to decode an indicia from the image data;
- a photodiode configured to:
  - receive ambient light, and
  - generate ambient light data based on the ambient light; and
- one or more processors configured to:
  - determine an ambient lighting condition based on the ambient light data,
  - determine, based on the ambient lighting condition, whether to cause the imaging device to output a first feedback response or a second feedback response in response to a successful indicia decode, and
  - responsive to receiving a successful indicia decode indication from the indicia decoder, cause the imaging device to output the first feedback response or the second feedback response,
- wherein the one or more processors are further configured to:
- cause the imaging sensor to capture a first portion of the image data during an inactive state;
- receiving an indication of a triggering event;
- responsive to receiving the indication, causing the imaging sensor to transition from the inactive state to an active state, wherein the active state comprises a decoding session; and
- cause, during the decoding session, the imaging sensor to capture a second portion of the image data.

10. The imaging device of claim 9, wherein the imaging sensor is further configured to capture the image data by:
- capturing a first frame that is illuminated at a first illumination level; and
- responsive to capturing the first frame, capturing a second frame that is illuminated at a second illumination level that is higher than the first illumination level.

11. The imaging device of claim 10, wherein the imaging sensor is further configured to capture the image data by:
- capturing a third frame in response to a triggering event, wherein the imaging sensor captures the third frame before the first frame.

12. The imaging device of claim 9, wherein the one or more processors further determine the ambient lighting condition by:
- determining one or more of (i) an average pixel value of the image data, or (ii) a peak pixel value of the image data; and
- determining whether the average pixel value satisfies a first threshold value or that the peak pixel value satisfies a second threshold value.

13. The imaging device of claim 9, wherein the one or more processors are further configured to determine an ambient lighting condition by:
- identifying a first portion of the image data corresponding to an indicia;
- segmenting the image data into the first portion and a second portion that excludes the first portion; and
- determining the ambient lighting condition based on the ambient lighting data and the second portion.

14. The imaging device of claim 9, further comprising a motion sensor configured to generate motion data associated with movement of the device, and wherein the one or more processors are further configured to:
- determine, based on the ambient lighting condition and the motion data, whether to cause the imaging device to output the first feedback response or the second feedback response in response to the successful indicia decode.

15. The imaging device of claim 9, wherein the first feedback response of the imaging device is an audible tone emitted by the imaging device at a first volume level, the second feedback response of the imaging device is an audible tone emitted by the imaging device at a second volume level that is different from the first volume level, and the one or more processors are further configured to:
- reduce the second volume level of the audible tone in proportion to the ambient lighting condition.

* * * * *